United States Patent [19]

Klevstad

[11] Patent Number: 5,778,597
[45] Date of Patent: Jul. 14, 1998

[54] SUPPORT DEVICE FOR POTTED PLANTS AND THE LIKE

[76] Inventor: Sven Klevstad, Hästskoringen 24, 184 94 Åkersberga, Sweden

[21] Appl. No.: 913,459
[22] PCT Filed: Apr. 24, 1996
[86] PCT No.: PCT/SE96/00540
  § 371 Date: Sep. 5, 1997
  § 102(e) Date: Sep. 5, 1997
[87] PCT Pub. No.: WO96/33603
  PCT Pub. Date: Oct. 31, 1996

[30]   Foreign Application Priority Data

Apr. 27, 1996 [SE] Sweden .................. 9501565

[51] Int. Cl.$^6$ .................................. A01G 17/14
[52] U.S. Cl. ................................ 47/47; 47/71
[58] Field of Search ................... 47/47, 71, 41.11

[56]        References Cited

U.S. PATENT DOCUMENTS

| D. 149,053 | 3/1948 | Epstein | 47/47 |
| 2,577,373 | 12/1951 | Smith | 47/47 |
| 4,860,489 | 8/1989 | Bork | 47/47 |
| 5,473,839 | 12/1995 | Stidham | 47/47 |
| 5,595,019 | 1/1997 | Foreman | 47/47 |
| 5,605,010 | 2/1997 | Furlong et al. | 47/47 X |

*Primary Examiner*—Michael J. Carone
*Assistant Examiner*—Yvonne R. Abbott
*Attorney, Agent, or Firm*—Fasth Law Firm; Rolf Fasth

[57]        ABSTRACT

A device for supporting potted plants and the like, comprising a saucer and at least one support pin which can be fitted to the rim of the saucer so as to support at its upper part a plant stem or stalk which stretches upwards from a plant pot resting on the saucer.

10 Claims, 2 Drawing Sheets

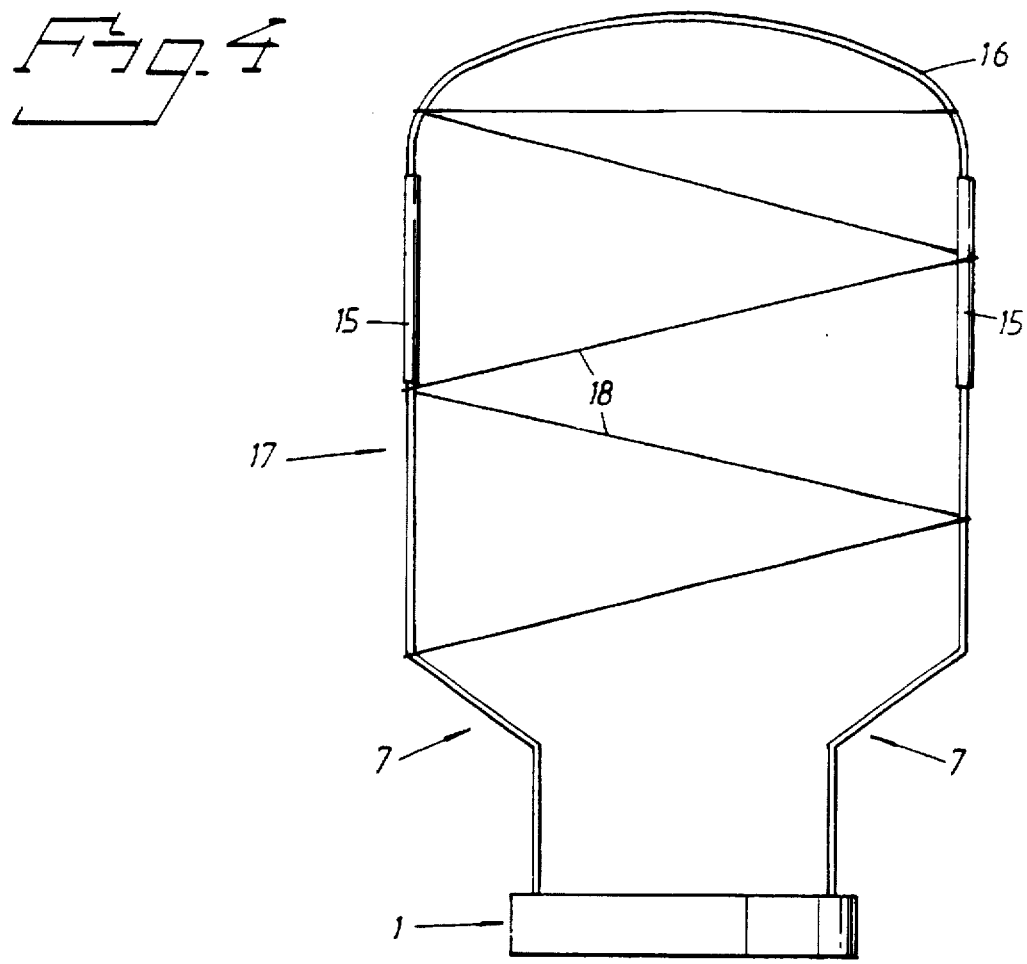
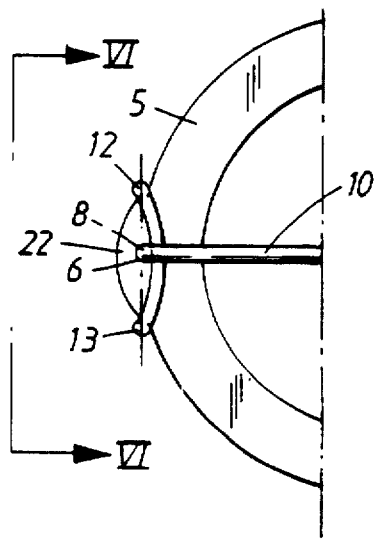
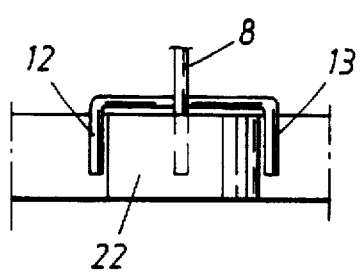

SUPPORT DEVICE FOR POTTED PLANTS AND THE LIKE

The invention relates to a device for supporting potted plants and the like, comprising a saucer and at least one support pin which can be fitted to the rim of the saucer so as to support at its upper part a plant stem or stalk which stretches upwards from a plant pot resting on the saucer.

Plant supporting devices of the aforesaid kind are known from NO-B-141 585, AT-C-327 598 and FR-A-1 254 850, for instance. The known plant support devices thus obviate the need of inserting a pin or stick into the soil contained in a plant pot. Publications AT-C-327 598 and NO-B-141 585 also disclose that the vertical plant-supporting pin shall be provided with a support arm which extends horizontally or obliquely upwards, such as to essentially intersect the vertical axis that extends through the vertical centre axis of the saucer or plant pot, so as to enable, for instance, a central plant stem in the pot to be tied at the intersection axis.

One problem with such plant support devices, however, is that the centrally located plant-securing point cannot be displaced vertically, for instance to accompany upward growth movement of the stems or stalks of the plant. For instance, a plant-securing ring fixed to the stem of the plant is unable to move upwards along the central axis while guided by the pin, and no higher located part of the pin is found adjacent the growing central plant stem.

An object of the present invention is therefore to provide a device with which the aforesaid drawback is avoided.

This object is achieved with a plant-supporting device defined in the following claim 1.

Further embodiments of the invention are set forth in the following dependent claims.

The advantages afforded by the fundamental concept of the invention and its further developments as defined in the dependent claims will be obvious to the skilled person, and the invention provides a device which, among other things, enables the centre of gravity of the growing plant to be easily kept at a central vertical axis, and also enables a pair of guide pins or sticks to be fastened alternatively to the saucer so as to form a basic structure to which a latticework or the like can be fitted, for instance when growing climbing or trailing plants.

According to one embodiment, the invention requires a plant pot from which a central plant stem grows to be placed centrally on a pot saucer which forms part of the inventive device. The saucer is provided with a vertical bore or hole in two mutually diametrically opposed rim regions of the saucer. A support pin can be pushed firmly into the bore, and the pin will preferably have stabilizing fingers which are in stabilizing contact with the saucer wall at two pin positions which are mutually separated by an angle of 180°.

The support pin includes two longitudinally separated and generally straight sections which are mutually connected by a spacer or intermediate section. The parallel displacement corresponds generally to the distance between the saucer centre axis to the bore in the rim of the saucer. One or two such pins can be fitted on the saucer rim, so that the upper part of the pin/pins will be directed generally vertically and located in the vicinity of a vertical axis that passes through the centre of the saucer, wherein the main plane of the saucer is thus a plane which lies normal to said axis. This enables the plant stem to be very easily tied or otherwise secured to the pin/pins and enables the tie to be moved upwards in relation to the pin.

Two support pins of the inventive kind can also be attached to diametrically opposing saucer edges in corresponding rotational positions, such that the aforesaid parts of the pin will lie in a common axial plane to the saucer, with the free pin-parts located at the greatest distance from the axis. Connecting elements can be used to extend the upper pin-parts vertically and/or to mutually connect the two, possibly extended upper ends of the support pins, so that together they form a frame in which trailing or climbing plants can be tied so as to be located in the axial plane of the saucer and the pot and preferably weight-centred in relation to the centre axis of said saucer and pot.

The inventive plant supporting device enables deviation of the centre of gravity of the plant from the central vertical axis of the saucer and the pot to be prevented in the best possible way, and to an extent which will not jeopardize the stability of the plant and pot unit.

Another advantage afforded by the inventive plant-supporting device is that when the supporting pins are positioned so that their upper parts lie close to the centre axis of the saucer, the upper part/parts of the supporting pin/pins can be hidden behind or among the leaves of the plant in a particularly effective manner.

Because the upper part of the pin is located level with the growth axis of a central plant stem, the stem can be tied or otherwise secured to the pin or pins higher up as the height of the stem increases with growth.

The invention will now be described in more detail with reference to an exemplifying embodiment thereof and also with reference to the accompanying drawing, in which FIG. 1 is a schematic axial section view of an inventive device supporting a potted plant in a pot seated on a pot saucer;

FIG. 4 is a schematic axial section view of an inventive device mounted to form a tying frame for a trailing or climbing plant;

FIG. 5 illustrates schematically an alternative embodiment of a pin attachment point on the plant pot, and illustrates the end-part of the pin in engagement with the pot; and FIG. 6 is a view taken on the line VI—VI in FIG. 5.

Figure 1:
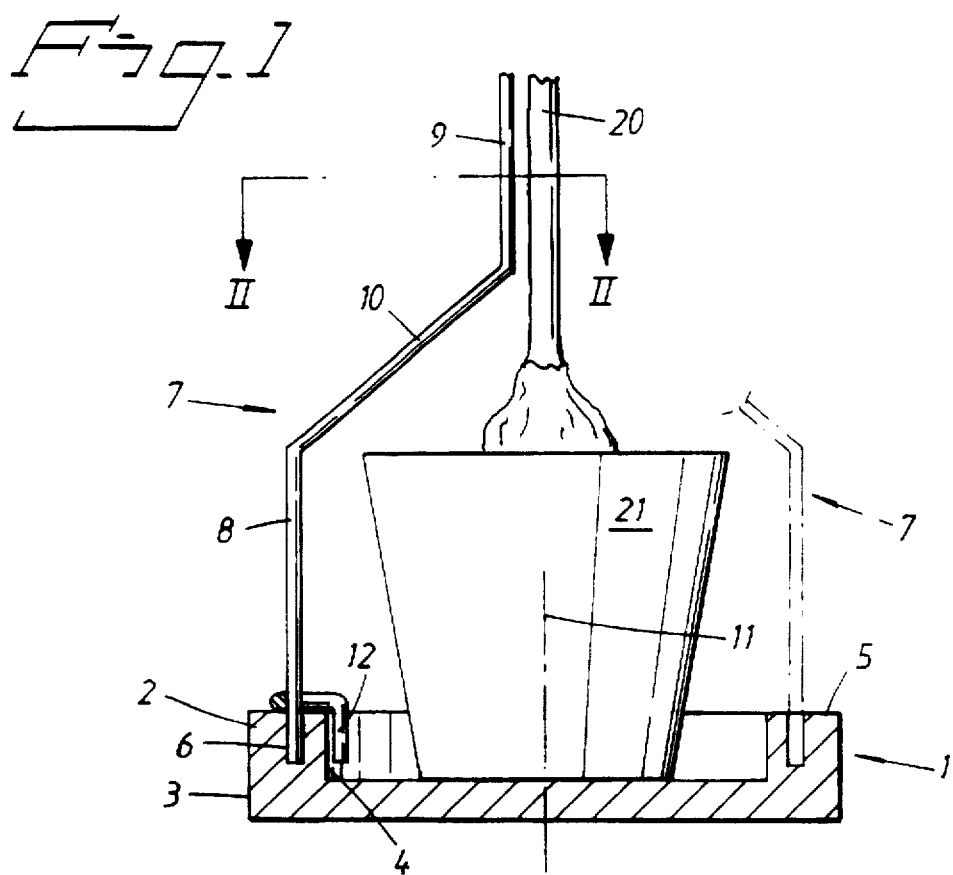
Figures 2, 3:
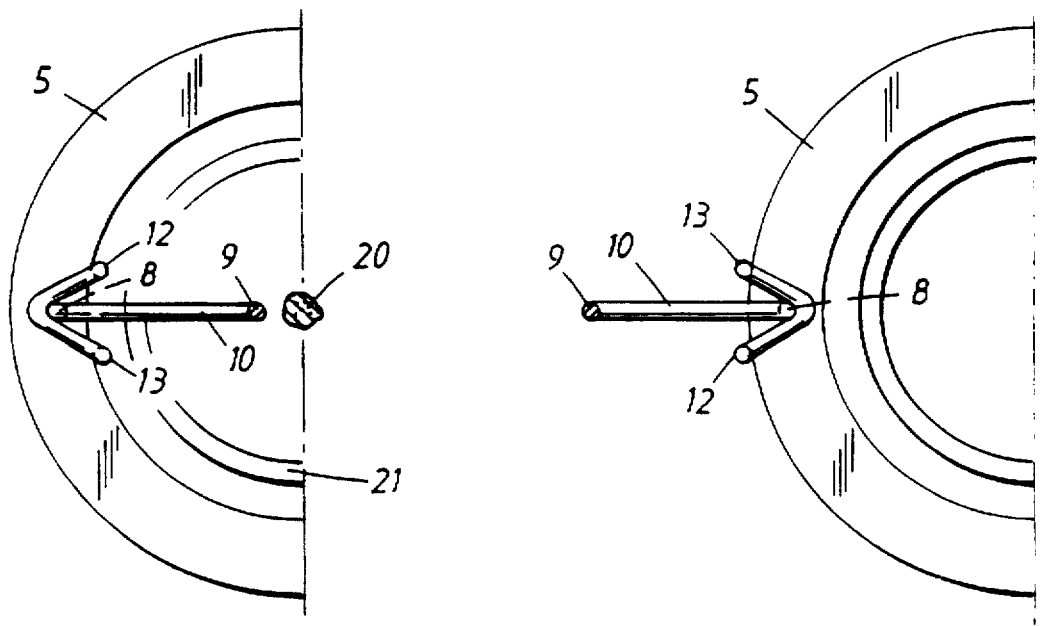
FIG. 2 is a view taken on the line II—II in FIG. 1.
FIG. 3 is a view corresponding to FIG. 2 and shows the supporting pin in a rotational position which deviates through one-half turn from the position shown in FIG. 2.

FIG. 1 illustrates a rotationally symmetrical pot saucer 1 having a circumferential rim comprising a vertical inner wall 4, and outer wall 3. A bore 6 is provided in the horizontal upper edge 5 of the rim. The bottom part 8 of a plant-supporting pin 7 is pushed into the bore 6. The pin 7 also has an upper part 9 which will be positioned generally vertically when the saucer 1 stands on a horizontal surface. The upper part 9 of the pin is connected to the bottom part 8 thereof by means of a connecting part 10 which places the upper part 9 in the vicinity of the central symmetrical axis 11 of the saucer 1 in the shown rotational position of the pin 7 around the axis represented by the bottom part 8 of said pin. This rotational position is defined by two fingers 12, 13, which are mutually parallel and engage the inner wall 4 of said rim when the bottom part 8 of the pin engages in the bore 6, as illustrated in FIG. 2. The bore 6 is slightly closer to the inner wall 4 than to the outer wall 3, therewith enabling the pin 7 to be mounted on the rim 2 in a rotationally secured position as illustrated in FIG. 3 and spaced through 180° from the position shown in FIG. 2, wherein the fingers 12, 13 lie against the outer wall 3 of said rim. The connecting part 10 may be straight and will preferably define an angle of about 135° with the pin parts 8, 9. The pin part 8 has a length which places the connecting part 10 above the rim of a plant pot 21.

It will be evident that a central stem 20 growing from a plant in a pot 21 that stands on the saucer 1 can be easily supported, by tying a band around the stem 20 and the upper part 9 of the pin, as shown in FIG. 1. It is also evident that a further pin 7 can be fitted into the bore 6 on the diametrically opposite side of the saucer, so as to improve plant tying stability.

FIG. 4 shows two pins 7 fitted into two diametrically opposed rim bores 6, with the orientations illustrated in FIG. 3. The upper parts 9 of the pins are extended with tubular members 15, which may be telescopic, and the upper ends of the tubular element 15 receive, in turn, the ends of a springy arcuate member 16, which has a generally straight shape memory and which therefore strives to spring apart the two remaining ends of the tubular elements 15. A framework can be fitted in the loop or arch formed by the pins 7, the members 15 and the arch 16, and in one embodiment the framework or latticework 17 is formed by a preferably elastic line 18 wound in zig-zag fashion in the established arch. The distance between the upper parts 9 of the two pins 7 is now approximately twice the diameter of the saucer, so as to provide sufficient space for tying or securing trailing or climbing plants in an axial plane to the saucer 1.

As shown in FIG. 4, the saucer rim 2 may be provided on its outside with two diametrically opposed bulges 22. Each bulge is also provided with a bore 6 for receiving the pin part 8. The bottom pin part is also provided with two vertical fingers 12, 13 which lie respectively against the outer wall 3 of the rim adjacent the bulge 22. The bore 6 is placed along a line which connects the two fingers 12, 13 as viewed in FIG. 5, therewith enabling the modified pin of the embodiment in FIGS. 5 and 6 to have two stable attachment positions that are mutually spaced through 180°.

I claim:

1. A supporting device for potted plants, comprising:

a pot saucer having a longitudinal axis, the pot saucer having an edge portion having a top portion with a bore defined therein, the pot saucer having an inner wall;

a support pin that is removably attached to the pot saucer, the support pin including a first member and a second member that is substantially parallel to the first member, the second member being radially displaced relative to the first member; and an attachment mechanism disposed at a bottom end of the first member to attach the support pin to the pot saucer so that the second member is adjacent to the longitudinal axis of the pot saucer, the attachment mechanism comprises a first, a second and a third protruding finger of which the second finger is in operative engagement with the bore defined in the edge portion of the pot saucer.

2. The supporting device according to claim 1 wherein the pot saucer has at least one other diametrically opposed bores defined therein, each bore has a support pin inserted therein.

3. The supporting device according to claim 1 wherein the first, second and third finger form an isosceles triangle.

4. The supporting device according to claim 1 wherein the bore is disposed through the top surface nearer the inner wall than an outer wall of the pot saucer.

5. The supporting device according to claim 1 wherein the first, second and third fingers protrude in the same plane and are substantially parallel to the support pin, the pot saucer has a protrusion at an outer wall, the bore is defined adjacent the protrusion so that the second finger engages the bore and the first and the third finger engage the outer wall on each side of the protrusion.

6. The supporting device according to claim 2 wherein the pot saucer has two diametrically opposed protrusions, each protrusion defines each of said bores.

7. The supporting device according to claim 1 wherein the support device has more than one support pin, each support pin has an extension member attached thereto, a flexible bridge member is attached to the extension member to form an arch, the arch has an upper part with a first radius and a lower part has a second radius, the first radius is greater than the second radius.

8. The supporting device according to claim 1 wherein the support device has more than one support pin and a resilient bridge member that form an arch.

9. The supporting device according to claim 8 wherein an elastic wire is attached to the arch in a zig-zag fashion and the resilient bridge member urges the support pins to move away from one another.

10. The supporting device according to claim 1 wherein the first and third finger are in operative engagement with the inner wall of the pot saucer so that the support pin is firmly held against the pot saucer, the support pin being movable between a first position and a second position, the first position and second position forming an angle that is about 180 degrees.

* * * * *

UNITED STATES PATENT AND TRADEMARK OFFICE
CERTIFICATE OF CORRECTION

PATENT NO. : 5,778,597
DATED : July 14, 1998
INVENTOR(S) : Sven Klevstad

It is certified that error appears in the above-identified patent and that said Letters Patent is hereby corrected as shown below:

On the Title page, item [30] Foreign Application Priority Data should read
-- April 27, 1995    [SE]        Sweden........................9501565 --.

Signed and Sealed this

Twenty-fourth Day of August, 1999

Attest:

Q. TODD DICKINSON

*Attesting Officer*      *Acting Commissioner of Patents and Trademarks*